(12) United States Patent
Herrmann et al.

(10) Patent No.: US 8,911,199 B2
(45) Date of Patent: Dec. 16, 2014

(54) CART WITH A SUPPORT SURFACE HAVING A SELECTIVELY ADJUSTABLE CONTOUR AND A PRINTING SYSTEM SHEET STACKER INCORPORATING THE CART

(71) Applicant: XEROX Corporation, Norwalk, CT (US)

(72) Inventors: Douglas K. Herrmann, Webster, NY (US); Derek A. Bryl, Webster, NY (US)

(73) Assignee: XEROX Corporation, Norwalk, CT (US)

( * ) Notice: Subject to any disclaimer, the term of this patent is extended or adjusted under 35 U.S.C. 154(b) by 121 days.

(21) Appl. No.: 13/779,815

(22) Filed: Feb. 28, 2013

(65) Prior Publication Data
US 2014/0241849 A1 Aug. 28, 2014

(51) Int. Cl.
*B60P 1/00* (2006.01)
*B65H 31/10* (2006.01)

(52) U.S. Cl.
CPC . *B60P 1/00* (2013.01); *B65H 31/10* (2013.01); B65H 2405/15 (2013.01); B65H 2801/06 (2013.01)
USPC ........................................ 414/790.1; 414/389

(58) Field of Classification Search
USPC .......... 108/52.1, 53.5; 198/347.3, 468.8, 610, 198/773, 777; 220/8; 270/58.18, 58.19; 271/161, 163, 171, 188, 207, 209, 213, 271/217, 220; 414/331.06–331.06, 331.1, 414/331.11, 331.14, 331.15, 331.18, 389, 414/391, 392, 399, 416.11, 495, 525.9, 593, 414/594, 608, 746.6, 788, 788.9, 789.7, 414/789.9, 790, 791.1, 792.7, 793.4, 793.8, 414/794.6, 795.8, 923; 493/412
See application file for complete search history.

(56) References Cited

U.S. PATENT DOCUMENTS

| | | | | |
|---|---|---|---|---|
| 2,973,856 A | * | 3/1961 | Brooks | 198/776 |
| 3,151,754 A | * | 10/1964 | Kemp, Jr. | 414/416.04 |
| 3,369,648 A | | 2/1968 | Wentz | |
| 3,528,576 A | * | 9/1970 | Taylor, Jr. et al. | 414/416.12 |
| 4,068,751 A | * | 1/1978 | Azzi | 193/36 |
| 4,195,963 A | * | 4/1980 | Levkoff et al. | 414/802 |
| 4,584,821 A | | 4/1986 | Booth | |
| 4,621,799 A | | 11/1986 | Bastow et al. | |
| 4,718,536 A | | 1/1988 | Toby | |
| 4,934,687 A | * | 6/1990 | Hayden et al. | 271/202 |
| 5,101,963 A | | 4/1992 | Skarlupka et al. | |
| 5,401,160 A | * | 3/1995 | Bellettato | 425/397 |
| 5,681,139 A | * | 10/1997 | Szanto | 414/495 |
| 5,718,322 A | | 2/1998 | Mulhern | |
| 5,806,442 A | | 9/1998 | Aldred et al. | |
| 6,032,004 A | | 2/2000 | Mirabella, Jr. et al. | |

(Continued)

Primary Examiner — Gregory Adams
(74) Attorney, Agent, or Firm — Gibb & Riley, LLC

(57) ABSTRACT

Disclosed is a cart having a support surface with a selectively adjustable contour for providing essentially uniform support to a load (e.g., a stack of print media sheets) during receiving and storing modes and for facilitating transfer of the load to another support surface during a transferring mode. The cart can comprise a support surface with alternating fixed and movable sections. In the receiving and storage modes, the movable sections can be top aligned with the fixed sections so that the support surface has an essentially planar contour for providing essentially uniform support. In the transferring mode, the movable sections can be dropped lower so that the support surface has a corrugated contour for facilitating transfer of the load (e.g., using an interdigitation technique). Also disclosed is a printing system sheet stacker incorporating such a cart for receiving, storing and transferring of a sheet stack as well as associated methods.

24 Claims, 15 Drawing Sheets

(56) References Cited

U.S. PATENT DOCUMENTS

| | | |
|---|---|---|
| 6,099,452 A | 8/2000 | Hoza et al. |
| 6,827,540 B2 * | 12/2004 | Walker et al. ............... 414/281 |
| 7,334,789 B2 | 2/2008 | Herrmann et al. |
| 7,461,759 B2 | 12/2008 | Guerra |
| 7,632,055 B2 | 12/2009 | Foroni |
| 7,736,114 B2 * | 6/2010 | Foster et al. ............... 414/398 |
| 7,832,977 B2 | 11/2010 | Brewer, III |
| 7,874,664 B2 | 1/2011 | Gervasi et al. |
| 7,901,176 B2 | 3/2011 | Minakawa |
| 8,105,006 B2 | 1/2012 | Brewer, III et al. |
| 8,147,175 B2 | 4/2012 | Brewer, III et al. |
| 2005/0042072 A1 * | 2/2005 | Amdahl et al. ............ 414/789.9 |
| 2011/0014021 A1 | 1/2011 | Reid et al. |
| 2011/0260392 A1 | 10/2011 | Herrmann et al. |
| 2012/0288354 A1 | 11/2012 | Moore |

\* cited by examiner

CART WITH A SUPPORT SURFACE HAVING A SELECTIVELY ADJUSTABLE CONTOUR AND A PRINTING SYSTEM SHEET STACKER INCORPORATING THE CART

BACKGROUND

The apparatuses and methods disclosed herein generally relate to carts for receiving, storing and transferring loads, such as a cart that can be integrated into the sheet stacker of a printing system in order to receive, store and transfer a stack of print media sheets, as well as associated methods.

Oftentimes, a stacker cart, which is used in conjunction with a sheet stacker in a printing system, will incorporate a ribbed support surface. Within the stacker, print media sheets are received and arranged in a stack on the ribbed support surface. Unfortunately, the support provided to the stack of print media sheets by the ribbed support surface is non-uniform. Such non-uniform support can lead to deformation (e.g., curling) of the sheets within the sheet stack and, particularly, deformation of the bottom sheets in a relatively large sheet stack and deformation of any sheets that are within a relatively small sheet stack and that have edges (e.g., trailing or leading edges) that land between ribs.

SUMMARY

In view of the foregoing, disclosed herein is a cart having a support surface with a selectively adjustable contour for providing essentially uniform support to a load (e.g., a stack of print media sheets) during receiving and storing modes and for facilitating transfer of the load to another support surface during a transferring mode. Specifically, the cart can comprise a support surface with alternating fixed and movable sections. In the receiving and storage modes, the movable sections can be top aligned with the fixed sections so that the support surface has an essentially planar contour for providing essentially uniform support (e.g., to prevent deformation of print media sheets within a stack of print media sheets on the support surface). In the transferring mode, the movable sections can be dropped lower so that the support surface has a corrugated contour for facilitating transfer of the load (e.g., using an interdigitation technique). Also disclosed herein is a printing system sheet stacker that incorporates such a cart for receiving, storing and transferring of a stack of print media sheets as well as associated methods.

More particularly, disclosed herein is a cart. The cart can comprise a frame and a support surface connected to the frame. The support surface can have a top that receives a load (e.g., a stack of paper sheets, of other print media sheets or of other flexible sheets) and can comprise alternating first sections and second sections. The second sections can be fixed to the frame such that the second sections are immovable at the top of the support surface and the first sections can be moveable relative to the second sections. Specifically, the first sections can be movable between a first position comprising an uppermost position, which is top aligned with the second sections (i.e., between a first position aligned with the second sections at the top of the support surface), and a second position, which is lower than the first position relative to the top of the support surface. When the first sections are in the first position, the top of the support surface will have a planar contour so as to provide essentially uniform support to the load (e.g., during load receiving and load storing modes). When the first sections are in the second position, the top of the support surface will have a corrugated contour so as to facilitate transferring of the load to an additional support surface.

Various additional features of the cart are also disclosed for moving the first sections of the support surface to the first position, for holding the first sections of the support surface in the first position, for moving the first sections of the support surface to the second position and for moving the cart back and forth between a load receiving and/or storing location and a load transferring location.

Also disclosed is a printing system sheet stacker that incorporates such a cart. Specifically, the sheet stacker can comprise a housing, having a first opening and a second opening, and a cart, which is manually movable into and out of the housing through the first opening. This cart can comprise a frame and a support surface connected to the frame.

The support surface can have a top that can receive print media sheets (e.g., paper sheets or other flexible print media sheets), which enter the housing through the second opening, such that the print media sheets are arranged in a stack on the top of the support surface. Optionally, the sheet stacker can comprise an elevator within the housing. This elevator can engage and lift the cart such that the top of the support surface is adjacent to the second opening when receiving of the print media sheets is initiated. Furthermore, this elevator can automatically lower the cart as the print media sheets are arranged in a stack.

In any case, the support surface can comprise alternating first sections and second sections. The second sections can be fixed to the frame such that the second sections are immovable at the top of the support surface and the first sections can be moveable relative to the second sections. Specifically, the first sections can be movable between a first position comprising an uppermost position, which is top aligned with the second sections (i.e., between a first position aligned with the second sections at the top of the support surface), and a second position, which is lower than the first position relative to the top of the support surface. When the first sections are in the first position, the top of the support surface will have a planar contour so as to provide essentially uniform support to the stack of print media sheets (e.g., during receiving and load storing modes). When the first sections are in the second position, the top of the support surface will have a corrugated contour so as to facilitate transferring of the stack of print media sheets to an additional support surface.

Various additional features of the printing system sheet stacker and, particularly, the stacker cart are also disclosed for moving the first sections of the support surface to the first position, for holding the first sections of the support surface in the first position, for moving the first sections of the support surface to the second position and for moving the stacker cart back and forth between a sheet stack receiving and/or storing location within the stacker housing and a sheet stack transferring location.

Also disclosed herein is a method of using a cart to receive, store and transfer a load. Specifically, the method can comprise receiving a load (e.g., a stack of paper sheets, of other print media sheets or of other flexible sheets) on a support surface of a cart. This cart can comprise a frame and the support surface can be connected to the frame. The support surface can have a top and can comprise alternating first sections and second sections. The second sections can be fixed to the frame such that the second sections are immovable at the top of the support surface and the first sections can be moveable relative to the second sections. During the process of receiving the load, the first sections can be in a first position comprising an uppermost position, which is top aligned with the second sections (i.e., a first position aligned with the second sections at the top of the support surface). When the first sections are in this first position, the top of the support surface will have a planar contour so as to provide essentially uniform support to the load (e.g., during load receiving and subsequent storing). After receiving the load, the first sections can be moved to a second position that is lower than the first position relative to the top of the support surface. When the first sections are in the second position, the top of the support surface will have a corrugated contour so as to facilitate transferring of the load to an additional support surface. After transferring the load, the first sections can be moved back into the first position in order to receive an additional load.

Various additional method steps are also disclosed for moving the first sections of the support surface to the first position, for holding the first sections of the support surface in the first position, for moving the first sections of the support surface to the second position and for moving the cart back and forth between a load receiving and/or storing location and a load transferring location.

Also disclosed is a method for using a cart in conjunction with a printing system stacker to receive, store and transfer a stack of print media sheets. Specifically, the method can comprise manually moving a cart into a sheet stacker housing through a first opening. This cart can comprise at least a frame and a support surface connected to the frame.

The method can further comprise receiving, by the top of the support surface, print media sheets, which enter the housing through a second opening. Specifically, the print media sheets can be received such that they are arranged in a stack on the top of the support surface. Optionally, prior to receiving the print media sheets, an elevator within the housing can be used to engage and lift the cart such that the top of the support surface is adjacent to the second opening when the process of receiving the print media sheets is initiated. As the print media sheets are received and arranged in the stack, this elevator can further be used to lower the cart.

In any case, the support surface can comprise alternating first sections and second sections. The second sections can be fixed to the frame such that the second sections are immovable at the top of the support surface and the first sections can be moveable relative to the second sections. Specifically, the first sections can be movable between a first position comprising an uppermost position, which is top aligned with the second sections (i.e., a first position aligned with the second sections at the top of the support surface), and a second position, which is lower than the first position relative to the top of the support surface. During the process of receiving the print media sheets, the first sections can specifically be in the first position (i.e., top aligned with the second sections) such that the top of the support surface has a planar contour so as to provide essentially uniform support to the stack of print media sheets.

The method can further comprise manually moving the cart back out of the housing through the first opening and further moving the first sections to the second position (i.e., lower than the first position) such that the top of the support surface has a corrugated contour to facilitate transferring of the stack of print media sheets to an additional support surface. After transferring the stack of print media sheets, the cart can be manually moved back into the housing through the first opening and the first sections can be moved back into the first position in order to receive an additional print media sheets.

Various additional method steps are also disclosed for moving the first sections of the support surface to the first position, for holding the first sections of the support surface in the first position, for moving the first sections of the support surface to the second position and for moving the stacker cart back and forth between a sheet stack receiving and/or storing location within the stacker housing and a sheet stack transferring location.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Oftentimes, a stacker cart, which is used in conjunction with a sheet stacker in a printing system, will incorporate a ribbed support surface. Within the stacker, print media sheets are received and arranged in a stack on the ribbed support surface. The stack of print media sheets is stored on the ribbed support surface until a user is ready to move (e.g., roll, slide, etc.) the cart to a transfer location (i.e., an unload location). At the transfer location, the ribbed support surface is interdigitated with (i.e., intercalated with, mated with, etc.) a complementary ribbed support surface of, for example, another cart. Then, one or both of the ribbed support surfaces on the carts are moved along a vertical axis in order to separate the ribbed support surfaces such that the complementary ribbed support surface is the higher of the two and, thereby such that the stack is transferred to the complementary ribbed support surface. The stacker cart is then moved back into position within the stacker housing. Unfortunately, as mentioned above, the support provided by the ribbed support surface is non-uniform. Non-uniform support of a stack of print media sheets can lead to deformation (e.g., curling) of the sheets within the sheet stack and, particularly, deformation of the bottom sheets in a relatively large sheet stack and deformation of any sheets that are within a relatively small sheet stack and that have edges (e.g., trailing or leading edges) that land between ribs.

In view of the foregoing, disclosed herein is a cart having a support surface with a selectively adjustable contour for providing essentially uniform support to a load (e.g., a stack of print media sheets) during receiving and storing modes and for facilitating transfer of the load to another support surface during a transferring mode. Specifically, the cart can comprise a support surface with alternating fixed and movable sections. In the receiving and storage modes, the movable sections can be top aligned with the fixed sections so that the support surface has an essentially planar contour for providing essentially uniform support (e.g., to prevent deformation of print media sheets within a stack of print media sheets on the support surface). In the transferring mode, the movable sections can be dropped lower so that the support surface has a corrugated contour for facilitating transfer of the load (e.g., using an interdigitation technique). Also disclosed herein is a printing system sheet stacker that incorporates such a cart for receiving, storing and transferring of a stack of print media sheets as well as associated methods.

Figure 1:
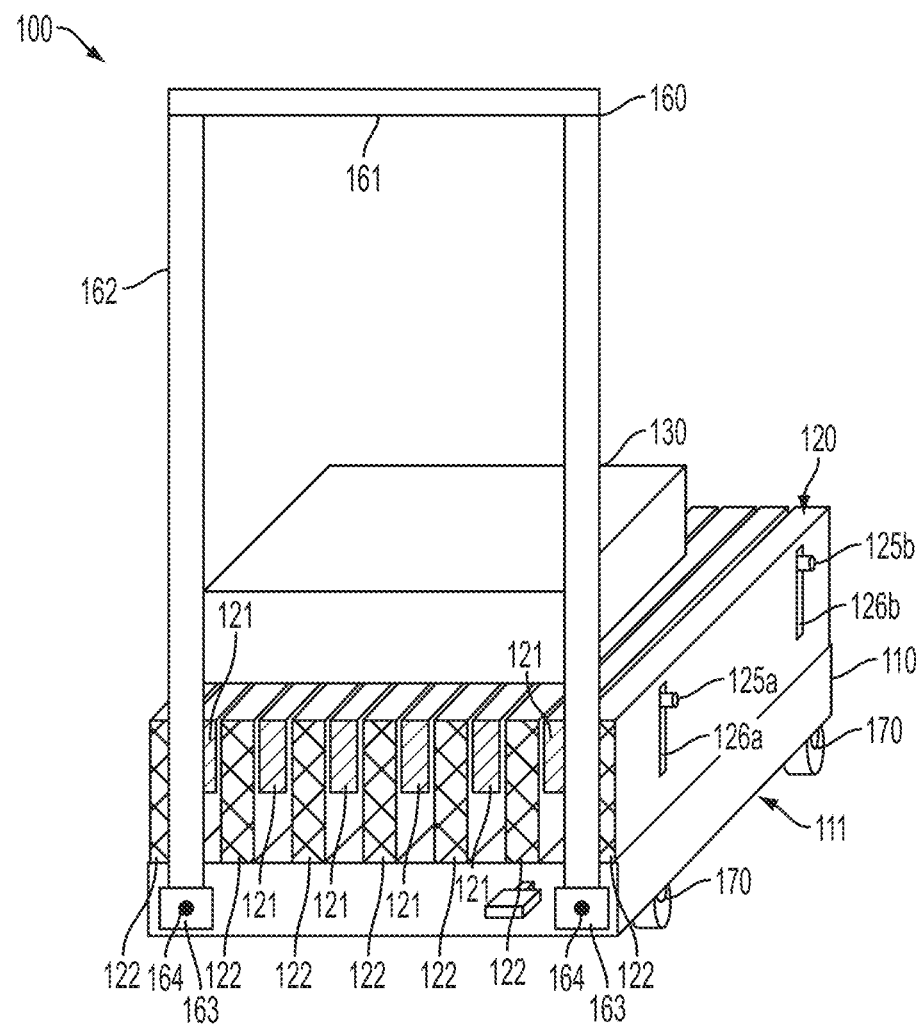
FIG. 1 is a schematic diagram illustrating a cart with movable first sections of a support surface in a first position.
Figure 2:
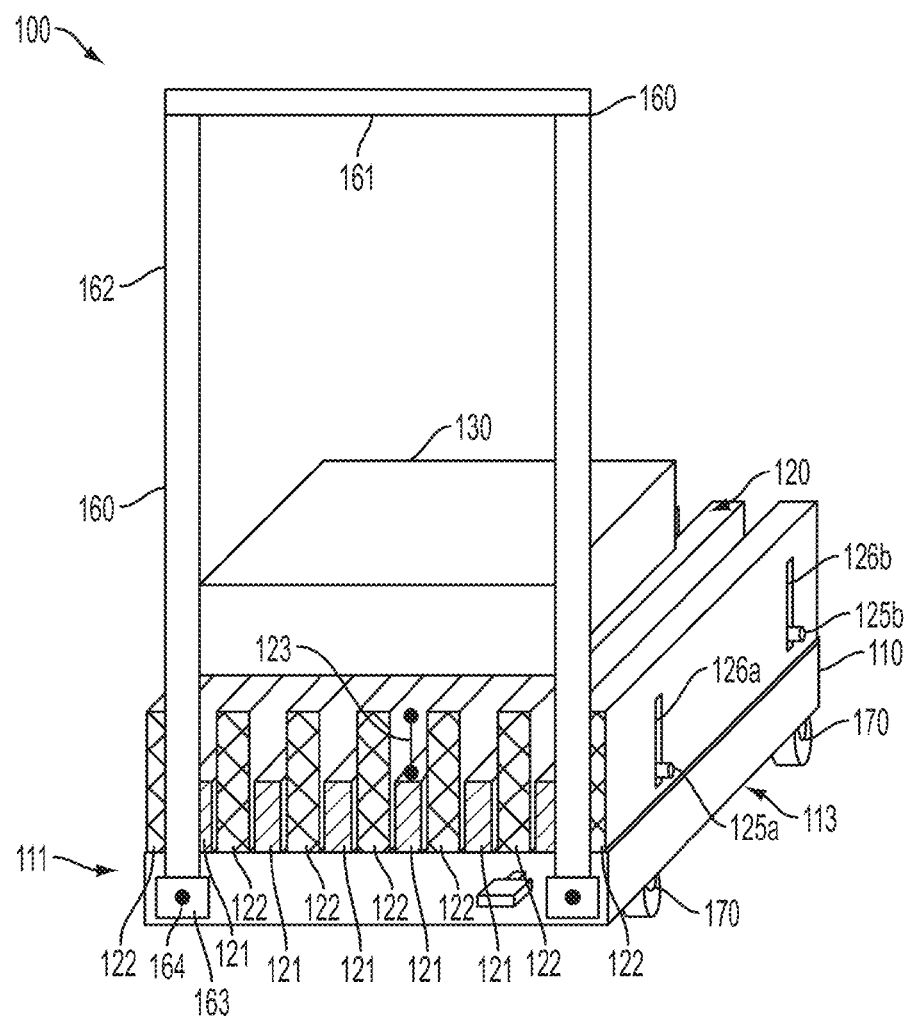
FIG. 2 is a schematic diagram illustrating the cart of FIG. 1 with the movable first sections of the support surface in a second position.

More particularly, referring to FIGS. 1 and 2 in combination, disclosed herein is a cart 100 (i.e., a pushcart, a handcart, a dolly, etc.). The cart 100 can comprise a frame 110 and a support surface 120 connected to (i.e., mounted on) the frame 110.

The support surface 120 can have a top that can receive, store and transfer (i.e., can be adapted to receive, store and transfer, can be configured to receive, store and transfer, can be used to receive, store and transfer, etc.) a load 130 (e.g., a stack of paper sheets, of other print media sheets or of other flexible sheets). The support surface 120 can comprise alternating first sections 121 (i.e., moveable sections) and second sections 122 (i.e., fixed sections).

The first sections 121 and second sections 122 can be elongated, rectangular-shaped, sections (also referred to herein as ribs or tines) with the first sections 121 being shorter than the second sections 122 (i.e., the first sections can have a first height and the second sections 122 can have a second height that is greater the first height). Additionally, the second sections 122 can be fixed and, more particularly, can be mounted directly to the frame 110 such that they remain in a fixed positioned relative to the frame 110 and the top of the support surface 120 (i.e., such that they are immovable relative to the frame and the top of the support surface 120). The first sections 121 can be moveable relative to the second sections 122 and, more particularly, can be mounted such that they are moveable vertically (i.e., up or down) relative to the level of the second sections 122. That is, the first sections 121 can be vertically movable between a first position, which is the uppermost position for the first sections 121 (i.e., the highest position possible) (see FIG. 1) and a second position, which is a lower position (see FIG. 2). In the first position as shown in FIG. 1 the first sections 121 can be top aligned with the second sections 122 such that the top surfaces of the first sections 121 and top surfaces of the second sections 122 are aligned (i.e., are coplanar). That is, in the first position the first sections 121 can be aligned with the second sections 122 at the top of the support surface 120. The second position as shown in FIG. 2 can be lower than the first position. That is, in the second position the first sections 121 can be lower than the second sections 122 relative to the top of the support surface 120. For example, in the second position, the first sections 121 can be bottom aligned with the second sections 122 such that the top surfaces of the first sections 121 are a specific distance 123 lower than the top surfaces of the second sections 122 (namely, a distance equal to the difference between the first height of the first sections 121 and the second height of the second sections).

Spacing between adjacent first sections 121 and second sections 122 should be only so wide as to allow unhindered (i.e., unobstructed, smooth, etc.) movement of the first sections 121 relative to the second sections 122. For example, spacing between adjacent first sections 121 and second sections 122 should be less than a ½ inch and, preferably, less than ¼ inch. Thus, when the first sections 121 are in the first position as shown in FIG. 1, the top of the support surface 120 will have a planar contour so as to provide essentially uniform support to the load 130 (e.g., during load receiving and load storing modes). When the first sections 121 are in the second position as shown in FIG. 2, the top of the support surface 120 will have a corrugated contour so as to facilitate transferring of the load 130 to an additional support surface (see more detailed discussion below).

Figure 3A:
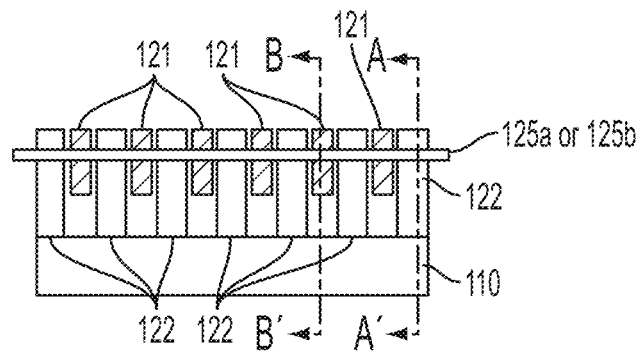
FIG. 3A is a vertical cross-section illustration of an exemplary support surface with the movable first sections in the first position.
Figure 3B:
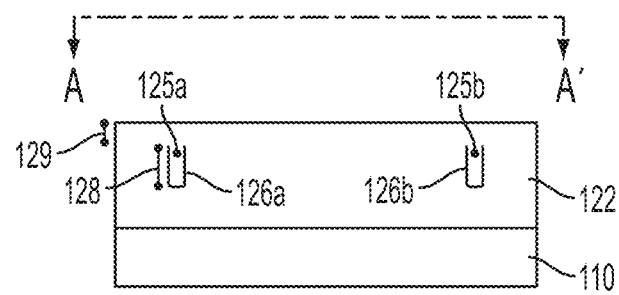
FIG. 3B is another vertical cross-section illustration of the exemplary support surface with the moveable first sections in the first position.
Figure 3C:
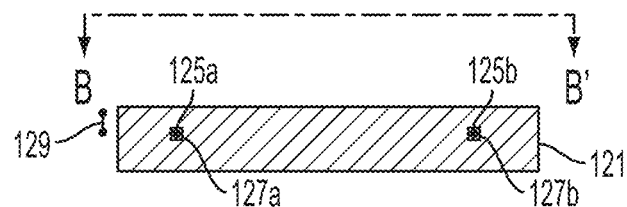
FIG. 3C is yet another vertical cross-section illustration of the exemplary support surface with the moveable first sections in the first position.
Figure 4A:
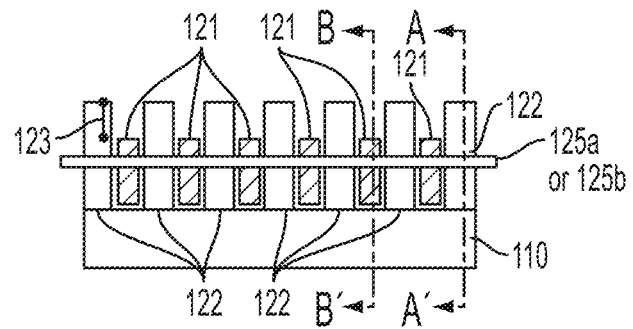
FIG. 4A is a vertical cross-section illustration of an exemplary support surface with the movable first sections in the second position.
Figure 4B:
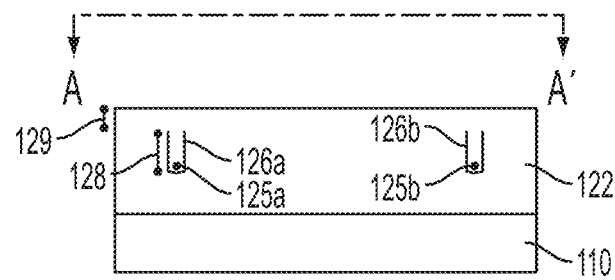
FIG. 4B is another vertical cross-section illustration of the exemplary support surface with the moveable first sections in the second position.
Figure 4C:
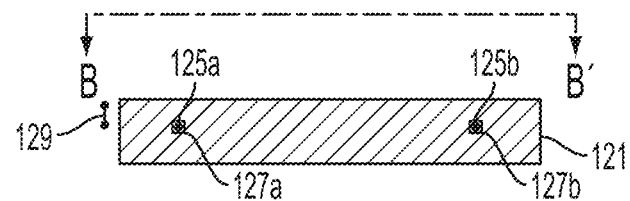
FIG. 4C is yet another vertical cross-section illustration of the exemplary support surface with the moveable first sections in the second position.

FIGS. 3A-3C are cross-section illustrations of an exemplary support surface 120 with the first sections 121 in the first position (i.e., top aligned with the second sections 122), whereas FIGS. 4A-4C are cross-section illustrations of the same exemplary support surface 120 with the first sections 121 in the second position (i.e., dropped lower than the first position). Referring to FIGS. 3A-3C and 4A-4C in combination with FIGS. 1 and 2, this exemplary support surface 120 can be configured as follows to allow for movement of the first sections 121 between the first position and the second position.

Each second section 122 can comprise at least two essentially identical, vertically oriented, through-slots (e.g., see the first through-slot 126a and the second through-slot 126b located at opposite ends of the second section 122, as shown in FIGS. 1, 2, 3B and 4B). Each through-slot 126a, 126b can further extend through the entire width of the second section 122. Each first section 121 can comprise at least two essentially identical through-holes (e.g., see the first through-hole 127a and the second through-hole 127b located at opposite ends of the first section 121, as shown in FIGS. 3C and 4C). Each through-hole 127a, 127b can extend through the entire width of the first section 121. All of the first through-holes 127a and first through-slots 126a at one end of the support surface 120 can be aligned and similarly all of the second through-holes 127b and second through-slots 126b at the opposite end of the support surface 120 can be aligned. A first support bar 125a can be thread through the aligned first through-holes 127a and first through-slots 126a and a second support bar 125b can be thread through the aligned second through-holes 127b and second through-slots 126b.

In all of the first sections 121, all of the through-holes 127a, 127b should be approximately equal in size (e.g., equal in diameter) to the support bars 125a, 125b such that the support bars 125a, 125b can be thread through the through-holes 127a, 127b but cannot otherwise move within the through-holes 127a, 127b. Additionally, in all of the first sections 121, the tops of all the through-holes should be a specific distance 129 from the corresponding top surfaces of the first sections 121. Similarly, in all the second sections 122, the top ends of all the through-slots 126a, 126b should be this same specific distance 129 from the corresponding top surfaces of those second sections 122. Additionally, in all of the second sections 122, the lengths 128 of the through-slots 126a, 126b between the top end and the bottom end should be equal to the desired distance 123 between the top surfaces of adjacent first and second sections 121, 122 when in the second position (i.e., the desired distance 123 for lowering the first sections 121 when moving from the first position to the second position). In this configuration, the first sections 121 can be simultaneous moved between the first position and second position and top alignment of the first sections 121 and second sections 122 is assured with the first sections 121 are moved into the first position.

Figure 7:
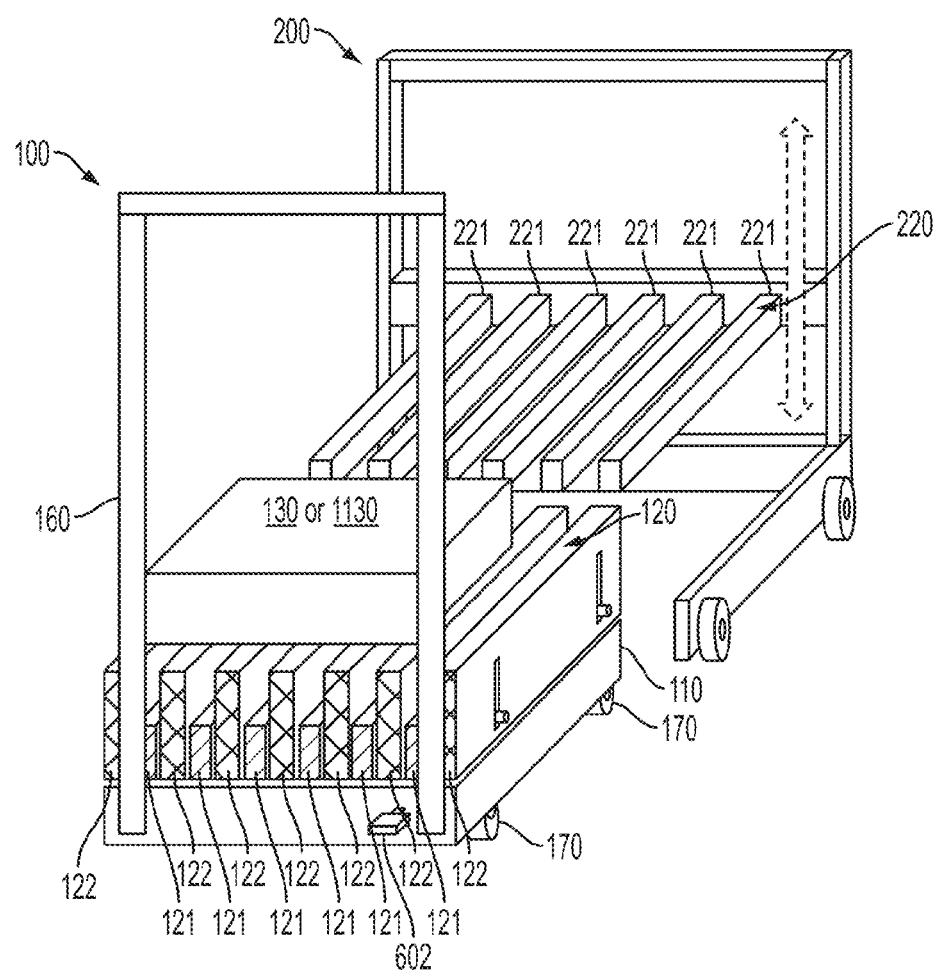
FIG. 7 is a schematic diagram illustrating the cart of FIG. 2 during a load transfer mode.

As mentioned above, when the first sections 121 are in the second position as shown in FIG. 2, the top of the support surface 120 will have a corrugated contour so as to facilitate transferring of the load 130 to an additional support surface (see more detailed discussion below). Specifically, as shown in FIG. 7, the corrugated contour of the support surface 120 when the first sections 121 are in the second position (i.e., lower than the first position) allows for interdigitation (i.e., intercalation with, mating with, etc.) with a complementary support surface 220 (e.g., of another cart 200, such as a truck-type or fork-type cart). That is, another cart 200 with a complementary support surface 220 having support sections 221 (also referred to herein as ribs or tines) can be mated with the support surface 120 of the cart 100 such that, as the carts 100, 200, are moved together the support sections 221 of the complementary support surface 220 of the cart 200 are moved into the spaces above the lowered first sections 121 and between the adjacent second sections 122 of the support surface 120 of the cart 100. Then, the support surface 120 and/or the complementary support surface 220 can be moved along a vertical axis in order such that the complementary support surface 220 is the higher than the support surface 120 and, thereby such that the load 130 is transferred to the complementary support surface 220.

It should be noted that the cart 100 can further comprise various other additional features that allow for moving and, particularly, lifting the first sections 121 of the support surface 120 to the first position, for holding the first sections 121 of the support surface 120 in the first position, and for moving and, particularly, lowering the first sections 121 of the support surface 120 to the second position.

Figure 5A:
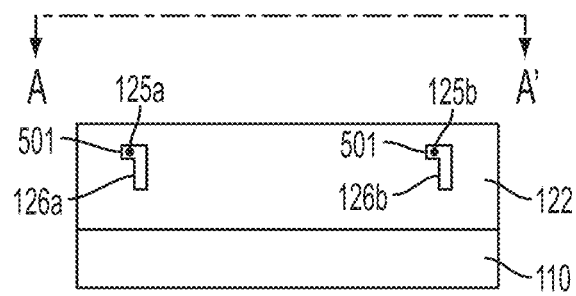
FIG. 5A is a vertical cross-section illustration of an exemplary support surface configured for movement of the first sections between the first and second position and showing the first sections in the first position.
Figure 5B:
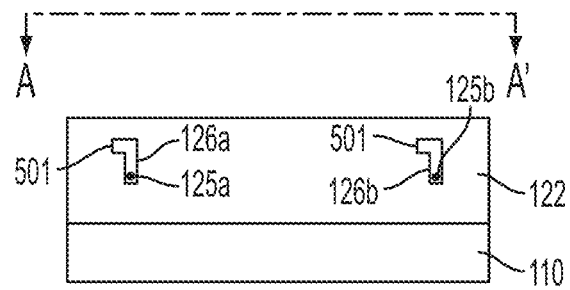
FIG. 5B is a vertical cross-section illustration of the exemplary support surface of FIG. 5A showing the first sections in the second position.

For example, as shown in FIGS. 5A and 5B, the first and second through-slots 126a, 126b on the outermost second sections 122 can each further comprise top end horizontal extensions 501 configure to allow a user to: (1) manually slide the support bars 125a, 125b up to the top ends of the through-slots 126a, 126b such that the first sections 121 are in the first position and further over into the horizontal extensions 501 such that the first sections 121 are supported and held in the first position (see FIG. 5A); and (2) manually slide the support bars 125a, 125b be out of the horizontal extensions 501 so that they can drop to the bottom ends of the through-slots 126a, 126b and, thereby moving the first sections 121 into the second position (see FIG. 5B).

Figure 6A:
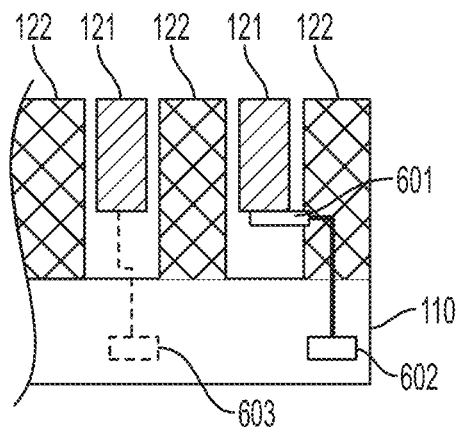
FIG. 6A is a vertical cross-section illustration of another exemplary support surface configured for movement of the first sections between the first and second position and showing the first sections in the first position.
Figure 6B:
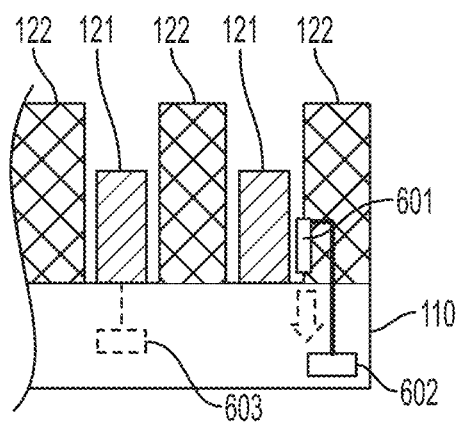
FIG. 6B is a vertical cross-section illustration of the exemplary support surface of FIG. 6A showing the first sections in the second position.

Alternatively, as shown in FIGS. 6A and 6B, one or more latches 601 can engage (i.e., can be adapted to engage, can be configured to engage, etc.) at least one of the first sections 121 so as to hold (i.e., maintain, lock, etc.) the first sections 121 in the first position. For example, the latch(es) 601 can comprise spring-loaded latches that automatically engage the first sections 121 to hold the first sections 121 in the first position when the first sections 121 are moved above the location of the latch(es) 601 to that first position (e.g., either manually or by an optional lift mechanism 603, such as a lever, foot pedal or pushbutton actuated lift mechanism) (see FIG. 6A). Such latch(es) 601 can further be operably connected to a release or, more particularly, a release mechanism 602 (e.g., a lever, foot pedal or pushbutton actuated release mechanism). This release mechanism 602 can be actuatable (e.g., depressable in the case of a lever, foot pedal or pushbutton) to release the latch(es) 601 and, thereby to allow the first sections 121 to move (e.g., drop by force of gravity) back down to the second position (see FIG. 6B). It should be noted that actuation of the release mechanism 602 can be manual (i.e., performed by the user). Alternatively, the release mechanism 602 can be configured and, particularly, can be positioned on the cart 100 such that as the carts 100 and 200 are brought together for transfer of the load 130, the release mechanism 602 will automatically be triggered (e.g., depressed). It should further be noted that the optional lift mechanism 603 can be a discrete mechanism from the release mechanism 602, as shown In FIGS. 6A and 6B. Alternatively, a more complex mechanism that combines both lift and release functions through the actuation of a lever, foot pedal or push button (e.g., by depressing a lever, foot pedal or push button a first time to lift the first sections 121 and, thereby engage the latch(es) 601 and by depressing a lever, foot pedal or push button a second time to release the latch(es) 601). It should further be noted that many different mechanisms (e.g., spring loaded mechanisms, hydraulic mechanisms, etc.) suitable for lifting, holding, and/or lowering device components could alternatively be incorporated into the cart disclosed herein. Such mechanisms are well known in the art and, thus, the details are omitted from this specification in order to allow the reader to focus on the salient aspects of the cart as disclosed.

Referring again to FIGS. 1 and 2, other features of the cart 100 can include, but are not limited to, wheels 170 and a push handle 160. The wheels 170 can be connected to the bottom surface 113 of the cart frame 110 relative to the top of the support surface 120 and can, for example, comprise conventional bi-directional type wheels (as shown) or caster type wheels. The push handle 160 can be connected to one end 111 of the cart frame 110. Specifically, the push handle 160 can be fixed to one end 111 of the frame 110 (e.g., screwed, bolted or soldered). Alternatively, the push handle 160 can be detachably mounted to one end 111 of the frame 110. For example, the push handle 160 can comprise a U-shaped handle with a center push bar 161 positioned laterally between two side rails 162. The frame 110 can comprise pockets 163 (i.e., cups or channels) on opposite sides of one end 111 of the frame 110 for receiving the side rails 162. The side rails 162 can be held in place in the pockets 163, for example, by a conventional button latch 164, which can be manually depressed in order to detach the push handle 160. The combination of wheels 170 and push handle 160 allow the cart 100 to be manually moved and, particularly, rolled between load receiving, storing and transferring locations.

Figure 8:
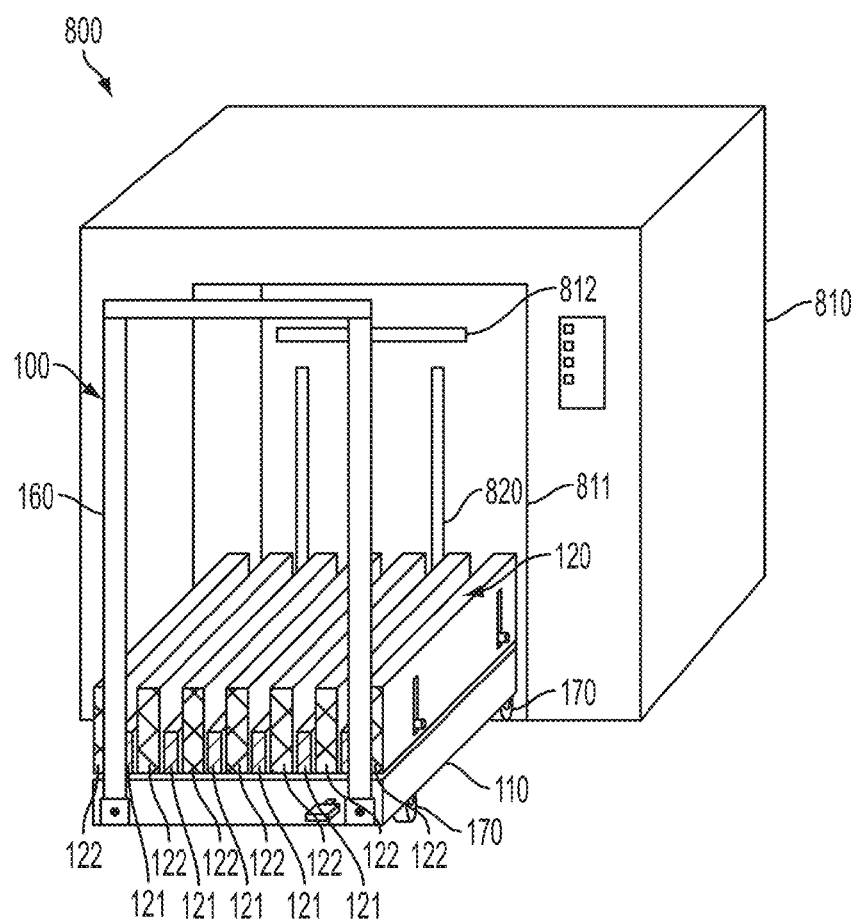
FIG. 8 is a schematic diagram illustrating a printing system sheet stacker incorporating a cart having a support surface with alternating movable first sections and fixed second sections.

Referring to FIG. 8, also disclosed is a printing system sheet stacker 800 (i.e., a sheet stacker module (as shown) of a modular printing system or integrated sheet stacker in a non-modular printing system). This sheet stacker 800 can incorporate the cart 100 described in detail above and illustrated in FIGS. 1-7, as an integrated cart/stacker tray.

Specifically, the sheet stacker 800 can comprise a housing 810, having a first opening 811 and a second opening 812. The sheet stacker 800 can further comprise the cart 100, which is manually movable (i.e., slidable, rollable, etc.) into and out of the housing 810 through the first opening 811. The sheet stacker 800 can further receive (i.e., can be adapted to receive, can be configured to receive, etc.) print media sheets (e.g., paper sheets or other flexible print media sheets), which are output from the printing system, through the second opening 812.

As described in detail above, the cart 100 can comprise a frame 110 and a support surface 120 connected to the frame 110. The cart 100 can further comprise wheels 170 connected to a bottom surface of the frame 110 relative to the top of the support surface 120 and a push handle 160 connected to one end of the frame 110 in order to facilitate movement into and out of the housing 810 through the first opening 811. Optionally, the handle 160 can be detachable in order to allow the cart 100 to be fully seated within the housing 810 (as shown in FIG. 9).

The support surface 120 of the cart 100 can have a top and can comprise alternating first sections 121 and second sections 122. The second sections 122 can be fixed to the frame 110 such that the second sections 122 are immovable relative to the frame 110 and the top of the support surface. The first sections 121 can be shorter than and moveable relative to the second sections 122. Specifically, the first sections 121 can be vertically movable between a first position, which is top aligned with the second sections 122 (i.e., between a first position aligned with the second sections 122 at the top of the support surface 120) and which is the uppermost position for the first sections 121 (i.e., the highest position possible) and a second position, which is lower than the first position relative to the top of the support surface 120 (e.g., which is bottom aligned with the second sections 122).

Figure 9:
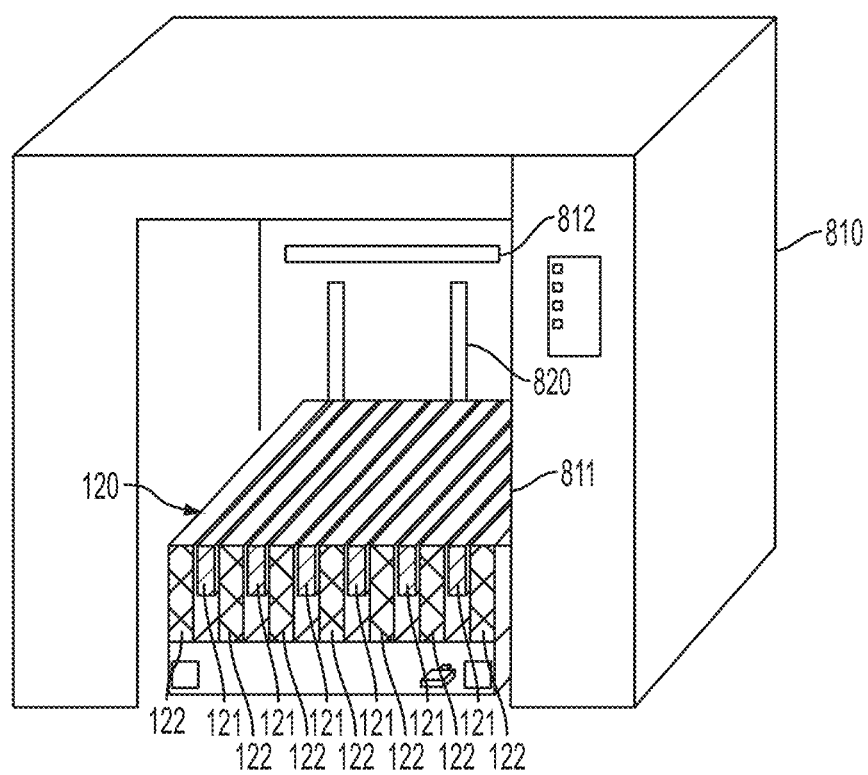
FIG. 9 is a schematic diagram illustrating the printing system sheet stacker of FIG. 8 with the cart seated in the housing and having the first sections of the support surface in the first position.
Figure 10:
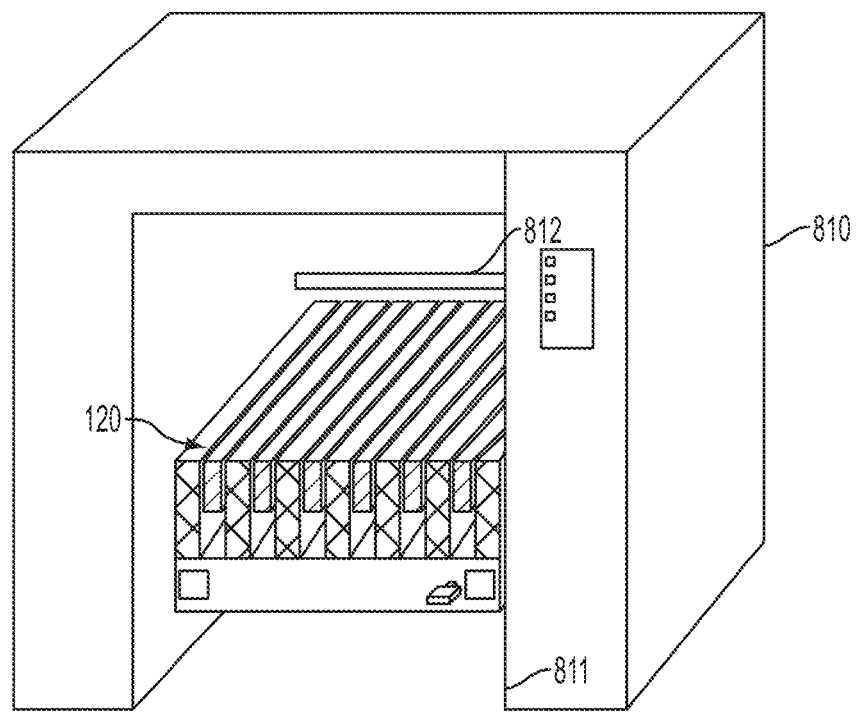
FIG. 10 is a schematic diagram illustrating the printing system sheet stacker of FIG. 8 with the cart raised within the housing and having the first sections of the support surface in the first position.
Figure 11:
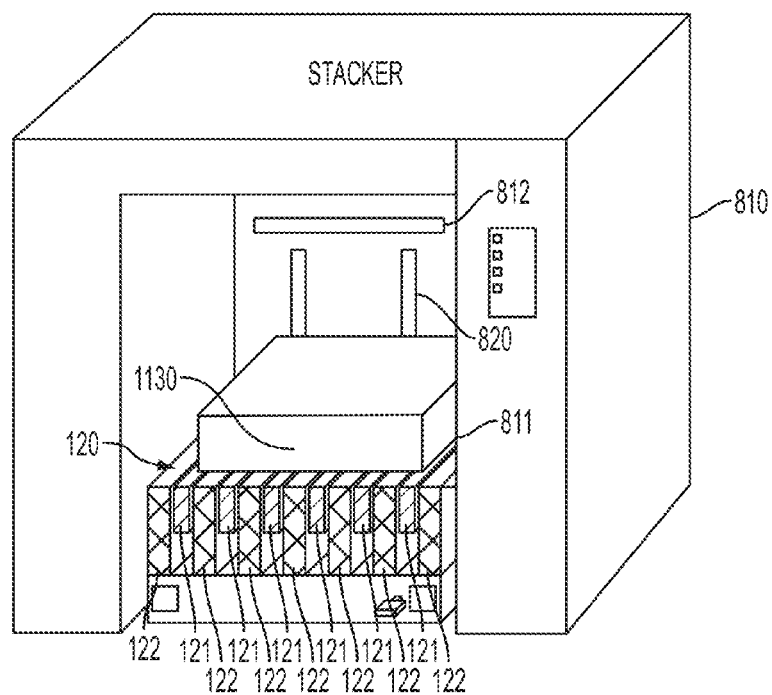
FIG. 11 is a schematic diagram illustrating the printing system sheet stacker of FIG. 8 with the cart within the housing and having a stack of print media sheets on the support surface.

When cart 100 is within the housing 810, as shown in FIG. 9, the first sections 121 can be held (i.e., locked) in the first position (i.e., top aligned with the second sections 122) so that the top of the support surface 120 has a planar contour. The top of the support surface 120 can then receive the print media sheets, which are output from the printing system and enter the housing 810 through the second opening 812. Optionally, the sheet stacker 800 can comprise an elevator 820 (i.e., elevator system) within the housing 810. This elevator 820 can engage and lift (i.e., can be adapted to engage and lift, can be configured to engage and lift, etc.) the cart 100 such that the top of the support surface 120 is moved to a height adjacent to the second opening 812 when the process of receiving the print media sheets is initiated (see FIG. 10). In any case, as the print media sheets enter the housing 810 through the second opening 812 and are received on the top of the support surface 120, they are arranged in a stack 1130 (e.g., see FIG. 11). It should be noted that the elevator 820 can further automatically lower (i.e., can be adapted to automatically lower, can be configured to automatically lower, etc.) the cart 100 as the print media sheets are received and arranged in the stack 1130 in order to accommodate the increasing stack height. Elevator systems for sheet stackers are well known in the art (e.g., see U.S. Patent Application Publication No. 20110260392 of Herrmann et. al, published on Oct. 27, 2011 and incorporated herein by reference) and, thus, the details of the elevator 820 are omitted from this specification in order to allow the reader to focus on the salient aspects of the disclosed sheet stacker.

Figure 12:
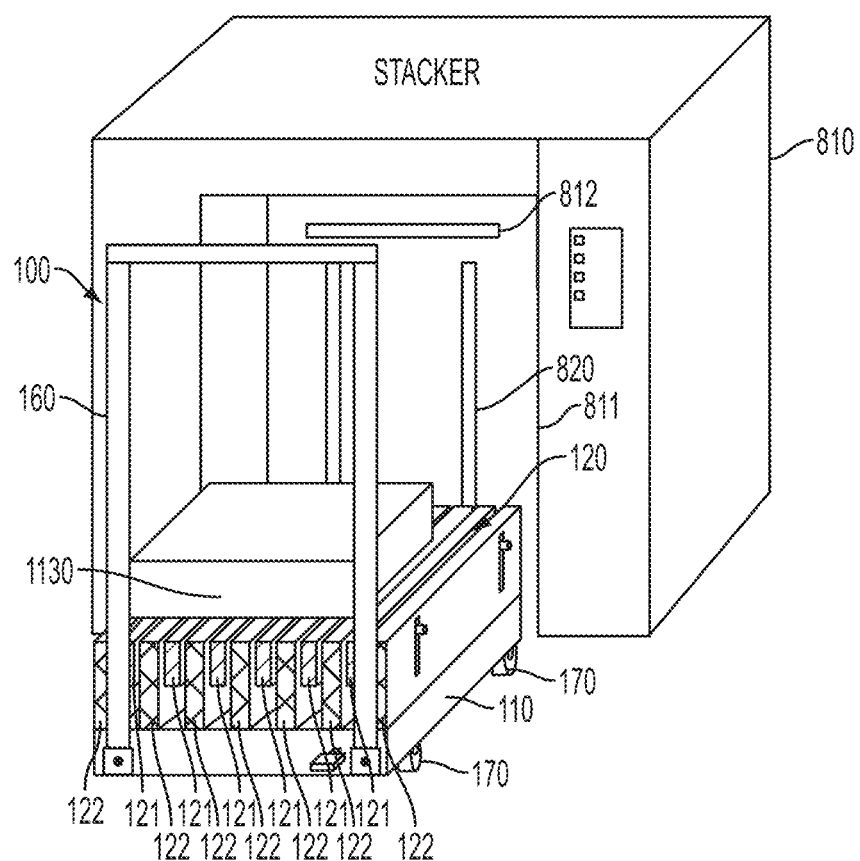
FIG. 12 is a schematic diagram illustrating the printing system sheet stacker of FIG. 8 with the cart being moved from the housing for transfer of the stack of print media sheets.

Since the first sections 121 are in the first position (i.e., top aligned with the second sections 122) when the print media sheets are received, the resulting planar contour of the top of the support surface 120 will provide essentially uniform support to the stack 1130 of print media sheets (e.g., during receiving and load storing modes) and, thereby will prevent deformation of the print media sheets within the stack 1130. However, when the handle 160 is reattached (if applicable) and the cart 100 is moved back out of the housing 810 through the first opening 811 (as shown in FIG. 12) in order to transfer (i.e., unload) the stack 1130 of print media sheets onto another support surface, the first sections 121 can be moved to the second position (i.e., lower than the first position relative to the top of the support surface 120) so that the top of the support surface 120 will have a corrugated contour in order to facilitate transferring of the stack 1130 (e.g., in the same manner as described in detail above and illustrated in FIG. 7).

It should be noted that, as described in detail above and illustrated in FIGS. 5A-5B and 6A-6B, the cart 100 can comprise various other additional features that allow for moving and, particularly, lifting the first sections 121 of the support surface 120 to the first position, for holding the first sections 121 of the support surface 120 in the first position, and for moving and, particularly, lowering the first sections 121 of the support surface 120 to the second position. Such additional features would allow the raising and lowering of the first sections 121 at any time regardless of whether the cart 100 is within the housing 810 or outside the housing 810. However, it should further be noted that, if the sheet stacker 800 comprises an elevator 820 and if a configuration similar to that shown in FIGS. 6A-6B with latch(es) 601, which automatically holds the first sections 121 of the support surface 120 in place when moved to the first position, and a release mechanism 602, which can be manually actuated to move the first sections 121 of the support surface 120 back to the second position, then in one embodiment the elevator 820 can automatically and simultaneously engage and lift (i.e., can be adapted to automatically and simultaneously engaged and lift, can be configured to automatically and simultaneously engage and lift, etc.) the first sections 121 as it engages and lifts the cart 100 itself. In this case, when the first sections 121 are moved by the elevator 820 above the location of the latch(es) 601 to that first position, the latch(es) 601 will automatically engage. By automatically and simultaneously moving the first sections 121 into the first position when the cart 100 is raised to receive print media sheets, the support surface will always present a planar contour as print media sheets are being stacked thereon.

Then, when the cart 100 is moved out of the housing 810 through the first opening 811, the release mechanism 602 (e.g., a lever, a foot pedal, pushbutton, etc.) can be actuated (e.g., depressed in the case of a lever, foot pedal or pushbutton) to release the latch(es) 601 and, thereby allow the first sections 121 to move (e.g., drop by force of gravity) back down to the second position to facilitate transfer of the stack 1130 to another support surface. As discussed previously, actuation of the release mechanism 602 can be manual (i.e., performed by the user). Alternatively, the release mechanism 602 can be configured and, particularly, can be positioned on the cart 100 such that as the carts 100 and 200 are brought together for transfer of the load 130, the release mechanism 602 will automatically be triggered (e.g., depressed).

Figure 13:
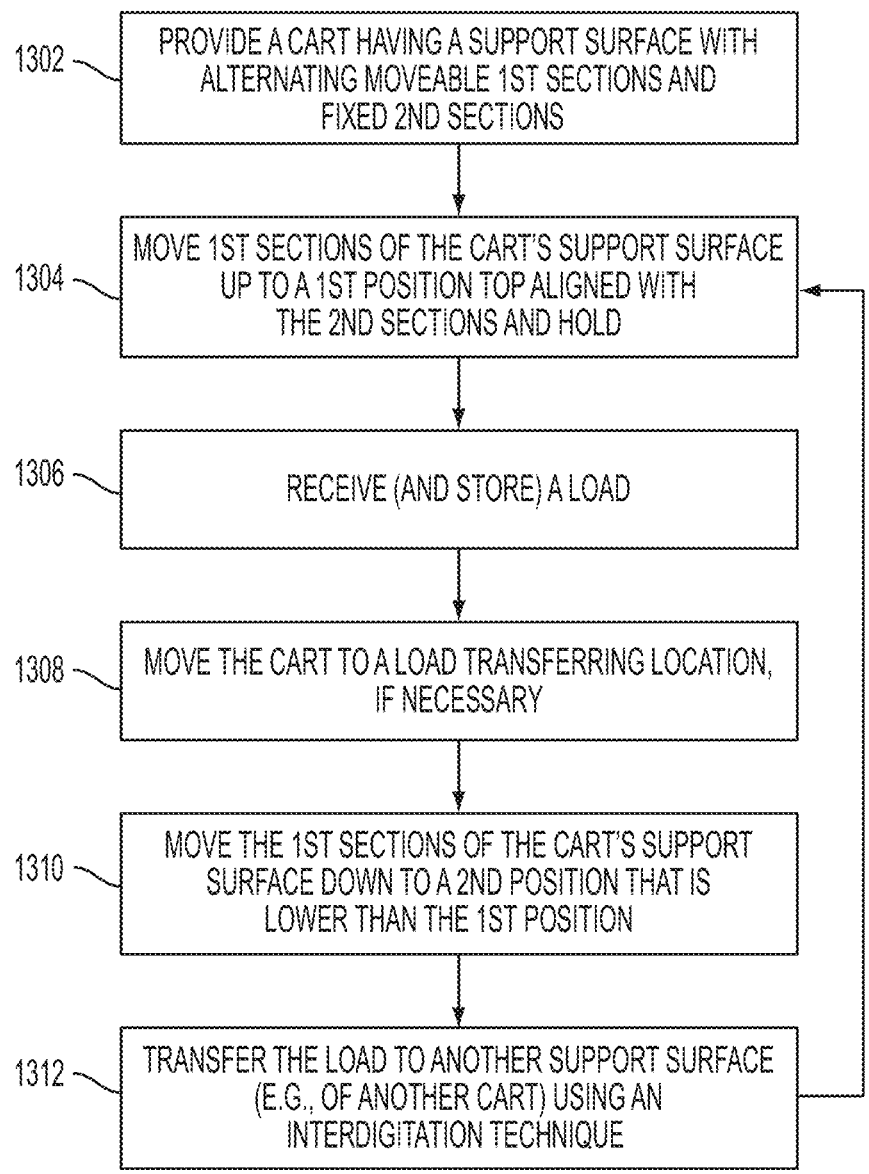
FIG. 13 is a flow diagram illustrating a method for using a cart to receive, store and transfer a load.

Referring to FIG. 13, also disclosed herein is a method for using a cart 100, as described in detail above and illustrated in FIGS. 1-2, to receive, store and transfer a load 130 (e.g., a stack of paper sheets, of other print media sheets or of other flexible sheets).

Specifically, the method can comprise providing a cart 100, having a support surface 120 with a top and alternating first sections 121 and second sections 122, where the first sections 121 are shorter and moveable relative to the second sections 122 (1302). Specifically, as discussed above, the second sections 122 can be fixed and, more particularly, can be mounted directly to the frame 110 such that they remain in a fixed positioned relative to the frame 110 and the top of the support surface 120 (i.e., such that they are immovable relative to the frame and the top of the support surface 120). The first sections 121 can be moveable relative to the second sections 122 and, more particularly, can be mounted such that they are moveable vertically (i.e., up or down) relative to the level of the second sections 122.

In the method, the first sections 121 of the cart 100 can be moved to a first position, top aligned with the second sections 122 such that the support surface 120 has a planar contour, as shown in FIG. 1 (1304). That is, the first sections 121 can be moved to a first position that is aligned with the second sections 122 at the top of the support surface 120. This first position can be the uppermost position achievable by the first sections 121. Next, the method can comprise receiving the load 130 on the top of the support surface 120 of the cart 100 (1306).

During the process 1306 of receiving the load 130 as well as during subsequent storing of the load 130, the first sections 121 can be held in the first position so that the planar contour of the top of the support surface 120 provides essentially uniform support to the load 130.

It should be noted that the processes of moving the first sections 121 to and holding the first sections 121 in the first position will vary depending upon the configuration of the support surface 120. For example, if, as shown in FIG. 5A and described in detail above, the support surface 120 is configured such that the first and second through-slots 126a, 126b on the outermost second sections 122 each comprise top end horizontal extensions 501, the support bars 125a, 125b can be manually slid up to the first position at the top ends of the through-slots 126a, 126b and, then, over into the horizontal extensions 501 in order to hold the first sections 121 in place in the first position. Alternatively, if, as shown in FIG. 6A, the support surface 120 is configured with one or more latches 601, the first sections 121 can be manually moved to the first position or can be moved to the first position by an optional lift mechanism 603 and, once there, the latch(es) 601 can automatically engage and hold the first sections 121 in the first position. Thus, no additional method steps are required to hold the first sections 121 in place once the first sections 121 are moved into the first position.

After receiving and, if applicable, after any storage of the load 130, the cart 100 can be moved to another location for transferring (i.e., off-loading) the load 130 (1308). Then, the first sections 121 can be moved to a second position that is lower than the first position relative to the top of the support surface 120 (e.g., that is bottom aligned with the second sections 122) such that the top of the support surface 120 has a corrugated contour, as shown in FIG. 2 (1310).

It should be noted that the process of moving the first sections 121 to the second position will also vary depending upon the configuration of the support surface 120. For example, if, as shown in FIG. 5B, the support surface 120 is configured such that the first and second through-slots 126a, 126b on the outermost second sections 122 each comprise top end horizontal extensions 501, the support bars 125a, 125b can be manually slid out of the horizontal extensions 501 and allowed to drop down into the second position at bottom ends of the through-slots 126a, 126b. Alternatively, as shown in FIG. 6B, a release mechanism 602 (e.g., a lever, a foot pedal, pushbutton, etc.) operably connected to the latch(s) 601 can be actuated (e.g., depressed in the case of a lever, foot pedal or pushbutton) to release the latch(es) 601 and, thereby allow the first sections 121 to move (e.g., drop by force of gravity) back down to the second position. Actuation of the release mechanism 602 can be manual (i.e., performed by the user) or, alternatively, automatically triggered during transferring of the load 130 (as discussed below at process 1312).

Once the first sections 121 are in the second position, the load 130 can be transferred to an additional support surface 220, for example, of another cart 200 using an interdigitation technique (i.e., an intercalation technique, a mating technique, etc.), as shown in FIG. 7 (1312). Specifically, as shown in FIG. 7, at process 1312 the corrugated contour of the top of the support surface 120 can be interdigitated with (i.e., intercalated with, mated with, etc.) a complementary support surface 220 (e.g., of another cart 200, such as a truck-type or fork-type cart). That is, another cart 200 with a complementary support surface 220 having support sections 221 (also referred to herein as ribs or tines) can be mated with the support surface 120 of the cart 100 such that, as the carts 100, 200, are moved together the support sections 221 of the cart 200 are moved into the spaces above the lowered first sections 121 and between the adjacent second sections 122 of the support surface 120 of the cart 100. Then, the support surface 120 and/or the complementary support surface 220 can be moved along a vertical axis in order such that the complementary support surface 220 is the higher than the support surface 120 and, thereby such that the load 130 is transferred to the complementary support surface 220.

After transferring (i.e., unloading) the load 130, the processes 1304-1312 can be iteratively repeated. That is, the first sections 121 can be moved back into the first position in order to receive an additional load (1304), a load can be received (1306) and so on.

Figure 14:
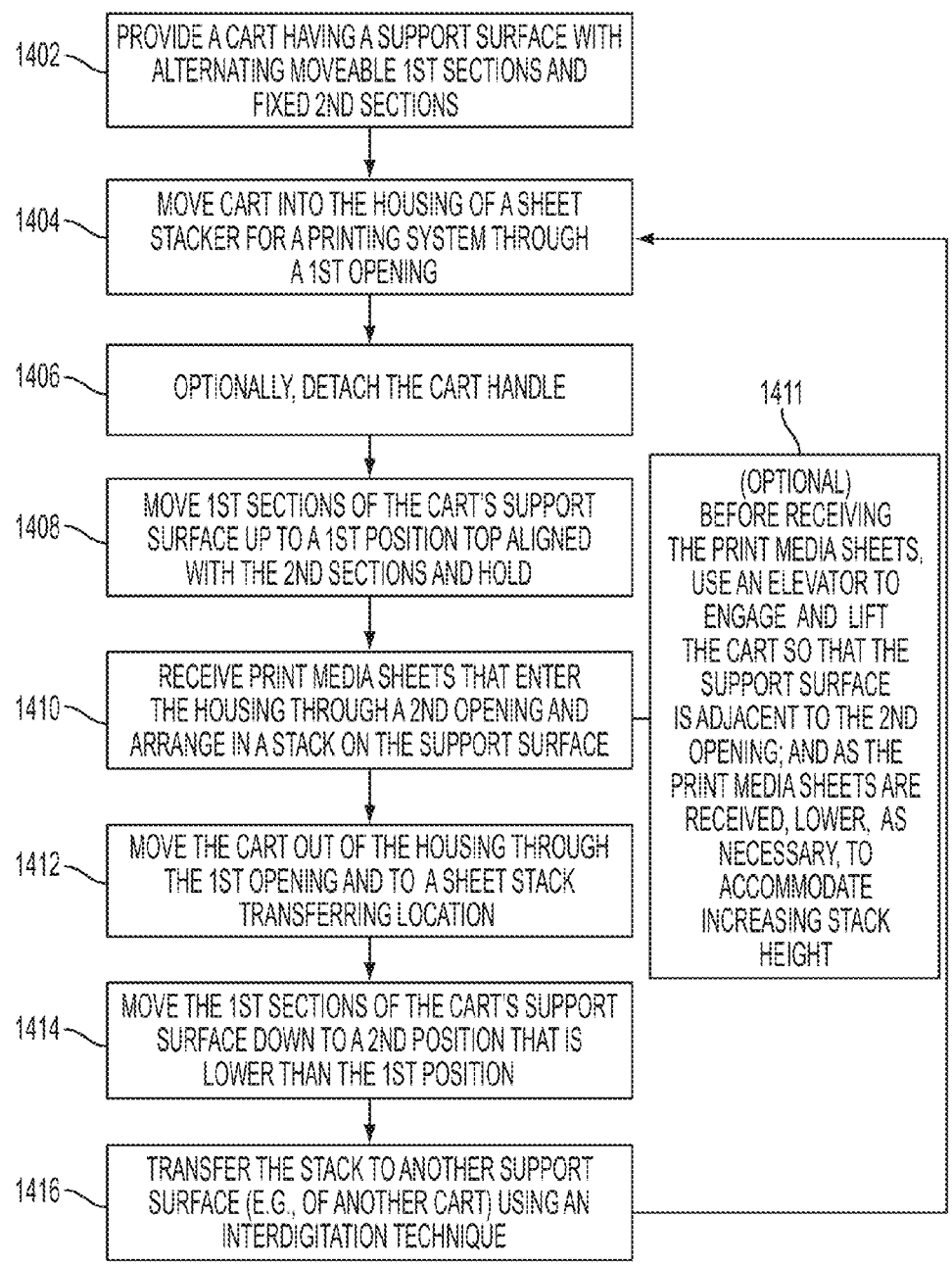
FIG. 14 is a flow diagram of a method for using a cart 100 as an integrated cart/stacker tray in a printing system sheet stacker in order to receive, store and transfer a stack of print media sheets.

Referring to FIG. 14, also disclosed is a method for using a cart 100, as described in detail above and illustrated in FIGS. 1-2, as an integrated cart/stacker tray in the printing system sheet stacker 800, as described in detail above and illustrated in FIG. 8, in order to receive, store and transfer a stack of print media sheets.

Specifically, the method can comprise providing a cart 100, having a support surface 120 with a top and alternating first sections 121 and second sections 122, where the first sections 121 are shorter than and moveable relative to the second sections 122 (1402). Specifically, as discussed above, the second sections 122 can be fixed and, more particularly, can be mounted directly to the frame 110 such that they remain in a fixed positioned relative to the frame 110 and the top of the support surface 120 (i.e., such that they are immovable relative to the frame and the top of the support surface 120). The first sections 121 can be moveable relative to the second sections 122 and, more particularly, can be mounted such that they are moveable vertically (i.e., up or down) relative to the level of the second sections 122.

In the method, this cart 100 can be manually moved (e.g., slid, rolled, etc.) into a housing 810 for a sheet stacker 800 through a first opening 811 (1404). Optionally, once in the housing 810, the handle 160 of the cart can be detached in order to allow the cart 100 to be fully seated within the housing 810 (as shown in FIG. 9) (1406).

The first sections 121 of the cart 100 can be moved to a first position, top aligned with the second sections 122 such that the top of the support surface 120 has a planar contour, as shown in FIG. 9 (1408). That is, the first sections 121 can be moved to a first position that is aligned with the second sections 122 at the top of the support surface 120. This first position can be the uppermost position for the first sections 121 (i.e., the highest position possible).

Next, the method can comprise receiving, by the top of the support surface 120, print media sheets, which are output by the printing system and enter the housing 810 through a second opening 812 (1410). Optionally, prior to receiving the print media sheets, an elevator 820 within the housing 810 can be used to engage and lift the cart 100 such that the top of the support surface 120 is moved to a height adjacent to the second opening 812 (1411, see FIG. 10). In any case, as the print media sheets enter the housing 810 through the second opening 812 and are received on the top of the support surface 120, they are arranged in a stack 1130 (see FIG. 11). It should be noted that, during this process of receiving the print media sheets and arranging them in a stack 1130, the elevator 820 can further be used to automatically lower the cart 100 in order to accommodate the increasing stack height. Additionally, during this process of receiving the print media sheets, the first sections 121 can be held in the first position so that the planar contour of the support surface 120 provide essentially uniform support to the stack 1130.

It should be noted that the processes of moving the first sections 121 to and holding the first sections 121 in the first position will vary depending upon the configuration of the support surface 120. For example, if, as shown in FIG. 5A and described in detail above, the support surface 120 is configured such that the first and second through-slots 126a, 126b on the outermost second sections 122 each comprise top end horizontal extensions 501, the support bars 125a, 125b can be manually slid up to the first position at the top ends of the through-slots 126a, 126b and, then, over into the horizontal extensions 501 in order to hold the first sections 121 in place in the first position. Alternatively, if, as shown in FIG. 6A, the support surface 120 is configured with one or more latches 601, the first sections 121 can be manually moved to the first position or can be moved to the first position by an optional lift mechanism 603 and, once there, the latch(es) 601 can automatically engage and hold the first sections 121 in the first position. In one particular embodiment, instead of moving the first sections 121 to the first position manually or by using a lift mechanism 603, the elevator 820, which is used to engage and lift the cart at process 1411, can automatically and simultaneously be used to also engage and lift the first sections 121 to the first position at which time the latch(es) 601 will automatically engage to hold the first sections 121 in place. By using the elevator 820 to automatically and simultaneously moving the first sections 121 into the first position when the cart 100 is raised to receive print media sheets, the support surface 120 will always present a planar contour as print media sheets are being stacked thereon.

After receiving the print media sheets and arranging them in a stack 1130 and, if applicable, after any storage of the stack 1130, the cart 100 can be moved out of the housing 810 to another location for transferring (i.e., off-loading) the stack, as shown in FIG. 12 (1412). Then, the first sections 121 can be moved to a second position that is lower than the first position relative to the top of the support surface (e.g., that is bottom aligned with the second sections 122) such that the top of the support surface 120 has a corrugated contour, as shown in FIG. 2 (1414).

It should be noted that the process of moving the first sections 121 to the second position will vary depending upon the configuration of the support surface 120. For example, if, as shown in FIG. 5B, the support surface 120 is configured such that the first and second through-slots 126a, 126b on the outermost second sections 122 each comprise top end horizontal extensions 501, the support bars 125a, 125b can be manually slid out of the horizontal extensions 501 and allowed to drop down into the second position at bottom ends of the through-slots 126a, 126b. Alternatively, as shown FIG. 6B, a release mechanism 602 (e.g., a lever, a foot pedal, pushbutton, etc.) operably connected to the latch(s) 601 can be actuated (e.g., depressed in the case of a lever, foot pedal or pushbutton) to release the latch(es) 601 and, thereby allow the first sections 121 to move (e.g., drop by force of gravity) back down to the second position (see FIG. 6B). Actuation of the release mechanism 602 can be manual (i.e., performed by the user) or, alternatively, automatically triggered during transferring of the stack of print media sheets 1130 (as discussed below at process 1416).

Once the first sections 121 are in the second position, the stack 1130 can be transferred to an additional support surface 220, for example, of another cart 200 using an interdigitation technique (i.e., an intercalation technique, a mating technique, etc.), as shown in FIG. 7 (1416). Specifically, as shown in FIG. 7, at process 1416 the corrugated contour of the top of the support surface 120 can be interdigitated with (i.e., intercalated with, mated with, etc.) a complementary support surface 220 (e.g., of another cart 200, such as a truck-type or fork-type cart). That is, another cart 200 with a complementary support surface 220 having support sections 221 (also referred to herein as ribs or tines) can be mated with the support surface 120 of the cart 100 such that, as the carts 100, 200, are moved together the support sections 221 of the complementary support surface 220 on the cart 200 are moved into the spaces above the lowered first sections 121 and between the adjacent second sections 122 of the support surface 120 of the cart 100. Then, the support surface 120 and/or the complementary support surface 220 can be moved along a vertical axis in order such that the complementary support surface 220 is the higher than the support surface 120 and, thereby such that the stack 1130 is transferred to the complementary support surface 220.

After transferring (i.e., unloading) the stack 1130, the processes 1404-1416 can be iteratively repeated. That is, the cart 100 can be moved (e.g., rolled, slid, etc.) back into the housing first sections 121 (1404), the cart handle 160 can be detached (1406), etc.

Figure 15:
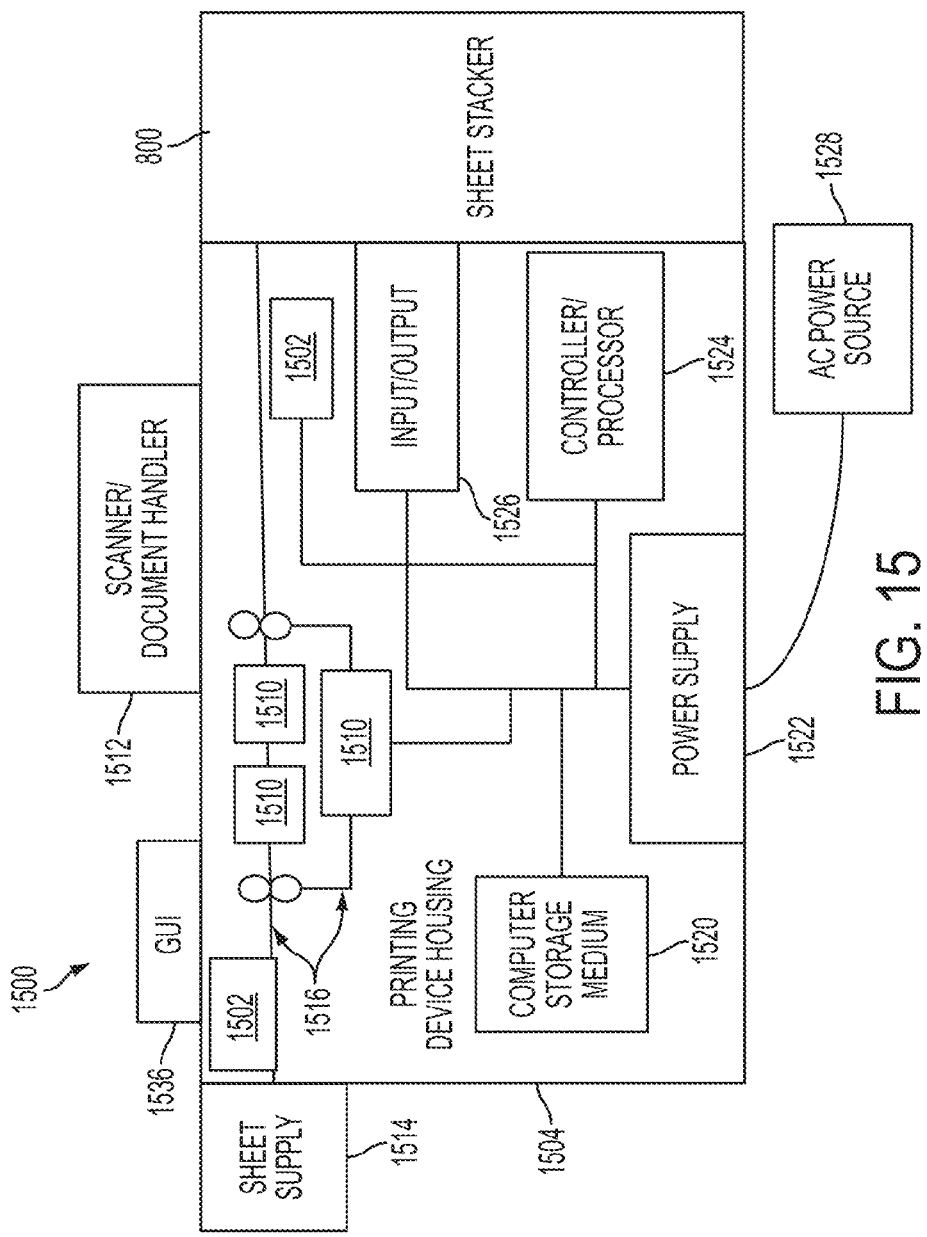
FIG. 15 is a schematic diagram illustrating an exemplary printing system incorporating the sheet stacker of FIG. 8.

As mentioned above, the apparatuses (e.g., the cart 100 and sheet stacker 800, which incorporates such a cart 100) as well as the methods of operating these apparatuses disclosed herein can be used in conjunction with a printing system. FIG. 15 illustrates on such printing system 1500. This printing system 1500 can comprise, for example, a printer, copier, multi-function machine, multi-function device (MFD), etc. The printing system 1500 can comprise a computerized printing device 1504 that includes a controller/processor 1524 and a communications port (input/output) 1526 operatively connected to the processor 1524 and to a computerized network 1502 external to the printing device 1504. Also, the computerized printing device 1504 can include at least one accessory functional component, such as a graphic user interface assembly 1536 that also operate on the power supplied from the external power source 1528 (through the power supply 1522).

The input/output device 1526 is used for communications to and from the computerized printing device 1504. The processor 1524 controls the various actions of the computerized device. A non-transitory computer storage medium device 1520 (which can be optical, magnetic, capacitor based, etc.) is readable by the processor 1524 and stores instructions that the processor 1524 executes to allow the printing device to perform its various functions, such as those described herein. Thus, as shown in FIG. 15, a housing for the printing device 1504 contains one or more functional components that operate on power supplied from the alternating current (AC) 1528 by the power supply 1522. The power supply 1522 can comprise a power storage element (e.g., a battery), connects to an external alternating current power source 1528 and converts the external power into the type of power needed by the various components.

The computerized printing device 1504 also includes at least one marking device (printing engines) 1510 operatively connected to the processor 1524, a media path 1516 positioned to supply sheets of media from a sheet supply 1514 to the marking device(s) 510, etc. After receiving various markings from the printing engine(s), the sheets of print media can pass to a sheet stacker 800, as described in detail above and illustrated in FIG. 8, that receives and stacks the print media sheets onto the support surface 120 of a cart, such as that described in detail above and illustrated in FIGS. 1-2. Also, the computerized printing device 1504 can include at least one accessory functional component (such as a scanner/document handler 1512, etc.) that also operate on the power supplied from the external power source 1528 (through the power supply 1522).

Further, items 1502 represent the media processing components, which can, for example, change the size or shape of the media, form openings in the media, change the uniform background color of the media, etc. The physical media trays 1514 maintain unaltered media, and such unaltered media is supplied to the printing engine 1510 for printing operations. The media processing components 1502 have elements that physically alter the unaltered media. The processor 1524 maintains the status of unaltered media currently available within the physical media trays 1514, and the processor 1524 also maintains the status of currently available media processing components 1502 of the media processing components 1502.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted here from to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known by those ordinarily skilled in the art and are discussed in, for example, U.S. Pat. Nos. 6,032,004, and 7,874,664 the complete disclosures of which are fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

Therefore, disclosed above is a cart having a support surface with a selectively adjustable contour for providing essentially uniform support to a load (e.g., a stack of print media sheets) during receiving and storing modes and for facilitating transfer of the load to another support surface during a transferring mode. Specifically, the cart can comprise a support surface with alternating fixed and movable sections. In the receiving and storage modes, the movable sections can be top aligned with the fixed sections so that the support surface has an essentially planar contour for providing essentially uniform support (e.g., to prevent deformation of print media sheets within a stack of print media sheets on the support surface). In the transferring mode, the movable sections can be dropped lower so that the support surface has a corrugated contour for facilitating transfer of the load (e.g., using an interdigitation technique). Also disclosed herein is a printing system sheet stacker that incorporates such a cart for receiving, storing and transferring of a stack of print media sheets as well as associated methods.

What is claimed is:
1. An apparatus comprising:
a frame; and
a support surface connected to said frame, said support surface having a top receiving a load of flexible sheets, said support surface comprising alternating first sections and second sections, each first section being positioned laterally between and parallel to two second sections and said first sections being spaced apart from said second sections by less than ½ inch, said second sections being fixed to said frame such that said second sections are immovable at said top, and said first sections being movable between a first position comprising an uppermost position aligned with said second sections at said top and a second position lower than said first position relative to said top, said top having a planar contour when said first sections are in said first position so as to provide uniform support to said load of said flexible sheets.

2. The apparatus of claim 1, said first sections having a first height and said second sections having a second height that is less than said first height.

3. The apparatus of claim 1, said top having a corrugated contour when said first sections are in said second position that is lower than said first position so as to facilitate transferring of said load to an additional support surface.

4. The apparatus of claim 1, further comprising:
a latch on said apparatus and holding said first sections in said first position; and
a release on said apparatus operably connected to said latch, said release being actuatable to release said latch and allow movement of said first sections from said first position to said second position.

5. The apparatus of claim 1, further comprising:
wheels connected to a bottom surface of said frame relative to said top, such that said apparatus comprises a cart; and
a handle connected to said frame.

6. The apparatus of claim 1, said load comprising a stack of flexible sheets.

7. A sheet stacker for a printing system comprising:
a housing having a first opening and a second opening; and
a cart movable into and out of said housing through said first opening,
said cart comprising:
a frame; and
a support surface connected to said frame,
said support surface having a top receiving print media sheets entering said housing through said second opening such that said print media sheets are arranged in a stack on said support surface,
said support surface comprising alternating first sections and second sections,
said second sections being fixed to said frame such that said second sections are immovable at said top, and
said first sections being movable between a first position comprising an uppermost position aligned with said second sections at said top and a second position lower than said first position relative to said top.

8. The sheet stacker of claim 7, said top having a planar contour when said first sections are in said first position so as to provide uniform support to said stack.

9. The sheet stacker of claim 7, said top having a corrugated contour when said first sections are in said second position so as to facilitate transferring of said stack to an additional support surface.

10. The sheet stacker of claim 7, further comprising an elevator within said housing, said elevator engaging and lifting said cart such that said support surface is adjacent to said second opening when receiving of said print media sheets is initiated and said elevator lowering said cart as said print media sheets are arranged in a stack.

11. The sheet stacker of claim 10, said elevator further lifting said first sections into said first position and said sheet stacker further comprising a latch on said cart and automatically engaging said first sections to hold said first sections in said first position.

12. The sheet stacker of claim 11, further comprising a release on said cart operably connected to said latch, said release being actuatable to release said latch and allow movement of said first sections to said second position.

13. The sheet stacker of claim 7, further comprising:
wheels connected to a bottom surface of said frame relative to said top; and
a handle detachably connected to said frame.

14. The sheet stacker of claim 7, said print media sheets comprising paper sheets.

15. A method comprising:
receiving a load on a top of a support surface of a cart, said cart comprising a frame;
said support surface comprising alternating first sections and second sections,
said second sections being fixed to said frame such that said second sections are immovable at said top,
said first sections being movable relative to said second sections and,
during said receiving, said first sections being in a first position comprising an uppermost position aligned with said second sections at said top such that said top of said support surface has a planar contour and provides uniform support to said load; and
after said receiving of said load, moving said first sections to a second position lower than said first position relative to said top such that said top of said support surface has a corrugated contour to facilitate transferring of said load to an additional support surface.

16. The method of claim 15, further comprising, after said transferring of said load, moving said first sections back to said first position in order to receive an additional load.

17. The method of claim 15, said first sections being held in said first position by a latch and said moving of said first sections to said second position comprising releasing said latch.

18. The method of claim 15, said load comprising a stack of flexible sheets.

19. A sheet stacking and transferring method for a printing system, said method comprising:
moving a cart into a housing through a first opening, said cart comprising a frame and a support surface connected to said frame;
receiving print media sheets such that said print media sheets are arranged in a stack on a top of said support surface,
said print media sheets entering said housing through a second opening,
said support surface comprising alternating first sections and second sections,
said second sections being fixed to said frame such that said second sections are immovable at said top,
said first sections being movable relative to said second sections, and
during said receiving of said print media sheets, said first sections being in a first position comprising an uppermost position aligned with said second sections at said top such that said top of said support surface has a planar contour and provides uniform support to said stack;

moving said cart out of said housing through said first opening; and moving said first sections to a second position lower than said first position relative to said top such that said top of said support surface has a corrugated contour to facilitate transferring of said stack to an additional support surface.

20. The method of claim 19, further comprising, after said transferring of said stack, moving said cart back into said housing through said first opening and further moving said first sections back into said first position in order to receive additional print media sheets.

21. The method of claim 19, said first sections being held in said first position by a latch and said moving of said first sections to said second position comprising releasing said latch.

22. The method of claim 21, further comprising:

prior to said receiving of said print media sheets, using an elevator in said housing to engage and lift said cart such that said support surface is adjacent to said second opening when said receiving of said print media sheets is initiated; and during said receiving of said print media sheets, using said elevator to lower said cart as said print media sheets are arranged in said stack.

23. The method of claim 22, said latch being automatically engaged when said elevator engages and lifts said cart.

24. The method of claim 22, said print media sheets comprising paper sheets.

\* \* \* \* \*